US007366609B2

(12) United States Patent
Lee

(10) Patent No.: US 7,366,609 B2
(45) Date of Patent: Apr. 29, 2008

(54) NAVIGATION DEVICE WITH CONTROL FEATURE LIMITING ACCESS TO NON-NAVIGATION APPLICATION

(75) Inventor: Choy Wai Lee, Olathe, KS (US)

(73) Assignee: Garmin Ltd. (KY)

( * ) Notice: Subject to any disclaimer, the term of this patent is extended or adjusted under 35 U.S.C. 154(b) by 408 days.

(21) Appl. No.: 11/214,315

(22) Filed: Aug. 29, 2005

(65) Prior Publication Data
US 2007/0050136 A1    Mar. 1, 2007

(51) Int. Cl.
*G01C 21/00* (2006.01)
(52) U.S. Cl. ...................................... 701/213; 340/989
(58) Field of Classification Search ................. 701/1, 701/36, 200–213, 93; 455/456.1–456; 340/989–995.1
See application file for complete search history.

(56) References Cited

U.S. PATENT DOCUMENTS

| 6,708,086 B2 * | 3/2004 | Richard ......................... 701/1 |
| 6,721,658 B2 * | 4/2004 | Stadter et al. ............... 701/213 |
| 6,865,457 B1 * | 3/2005 | Mittelsteadt et al. ......... 701/35 |

* cited by examiner

*Primary Examiner*—Richard M. Camby

(74) *Attorney, Agent, or Firm*—Kevin E. West; Samuel M. Korte

(57) ABSTRACT

A portable navigation device is provided that includes a receiver configured to receive signals from GPS satellites. The device includes memory that stores a non-navigation application and non-navigation information related to the non-navigation application. A user interface is configured to enable an operator to enter non-navigation instructions related to the non-navigation application. The a processor module is provided that calculates a position of the device based on the signals from the GPS satellites. The processor module implements the non-navigation application and performs non-navigation operations defined by the non-navigation application based on the non-navigation instructions entered by the user. The processor module disables the non-navigation application after a predetermined trial period of time following a start time unless and until an application access code is entered. Optionally, a cartridge they may be included that is configured to receive an application access cartridge containing the application access code. The code indicates that access to the non-navigation application has been purchased by the user of the device. The processor module enables the non-navigation application when the application access cartridge is entered into the cartridge bay with a valid code. The processor may not disable the non-navigation application, such as when an application access code is incurred before and in of the predetermined trial period of time.

23 Claims, 12 Drawing Sheets

NAVIGATION DEVICE WITH CONTROL FEATURE LIMITING ACCESS TO NON-NAVIGATION APPLICATION

BACKGROUND OF THE INVENTION

The present invention is generally related to a navigational device configured to implement non-navigation applications, and more particularly to a device that enables and disables non-navigation applications based on access codes.

Portable handheld electronic devices exist today for a variety of uses and applications. For example, one type of conventional electronic device is a dedicated multi-language dictionary or translator, such as for use during travel to countries in which the operator is not necessarily fluent in the local language and customs.

Another type of conventional electronic device is a portable navigation device, such as for use with that the global positioning system (GPS). Portable navigation devices offer a variety of features related to routing and navigating through roadway networks, locating points of interest and the like.

However, heretofore, travelers were required to carry one portable device language translation and dictionary functions and a separate portable device that offered navigation and routing functions. A need exists for a single portable device capable of offering the functionality of a navigation device and of a language translator/dictionary, where the separate functions and applications are fully integrated with one another.

BRIEF DESCRIPTION OF THE INVENTION

In one embodiment, a portable navigation device is provided that includes a receiver configured to receive signals from GPS satellites. The device includes memory that stores a non-navigation application and non-navigation information related to the non-navigation application. A user interface is configured to enable an operator to enter non-navigation instructions related to the non-navigation application. The a processor module is provided that calculates a position of the device based on the signals from the GPS satellites. The processor module implements the non-navigation application and performs non-navigation operations defined by the non-navigation application based on the non-navigation instructions entered by the user. The processor module disables the non-navigation application after a predetermined trial period of time following a start time unless and until an application access code is entered. Optionally, a cartridge they may be included that is configured to receive an application access cartridge containing the application access code. The code indicates that access to the non-navigation application has been purchased by the user of the device. The processor module enables the non-navigation application when the application access cartridge is entered into the cartridge bay with a valid code. The processor may not disable the non-navigation application, such as when an application access code is incurred before and in of the predetermined trial period of time. The processor module validates the application access code and disables the code on the cartridge once utilized in order to prevent the cartridge from being used again.

DETAILED DESCRIPTION OF THE INVENTION

In the following detailed description of the invention, reference is made to the accompanying drawings which form a part hereof, and in which is shown, by way of illustration, specific embodiments in which the invention may be practiced. The embodiments are intended to describe aspects of the invention in sufficient detail to enable those skilled in the art to practice the invention. Other embodiments may be utilized and changes may be made without departing from the scope of the present invention. The following detailed description is, therefore, not to be taken in a limiting sense, and the scope of the present invention is defined only by the appended claims, along with the full scope of equivalents to which such claims are entitled.

The embodiment discussed hereafter are is drawn to navigational systems and devices having navigation and, route calculation capabilities. One type of navigational system includes Global Positioning Systems (GPS). Such systems are known and have a variety of uses. In general, GPS is a satellite-based radio navigation system capable of determining continuous position, velocity, time, and in some instances direction information for an unlimited number of users. Formally known as NAVSTAR, the GPS incorporates a plurality of satellites which orbit the earth in extremely precise orbits. Based on these precise orbits, GPS satellites can relay their location to any number of receiving units.

The GPS system is implemented when a device specially equipped to receive GPS data begins scanning radio frequencies for GPS satellite signals. Upon receiving a radio signal from a GPS satellite, the device can determine the precise location of that satellite via one of different conventional methods. The device will continue scanning for signals until it has acquired at least three different satellite signals. Implementing geometric triangulation, the receiver utilizes the three known positions to determine its own two-dimensional position relative to the satellites. Additionally, acquiring a fourth satellite signal will allow the receiving device to calculate its three-dimensional position by the same geometrical calculation. The positioning and velocity data can be updated in real time on a continuous basis by an unlimited number of users.

Figure 1A:
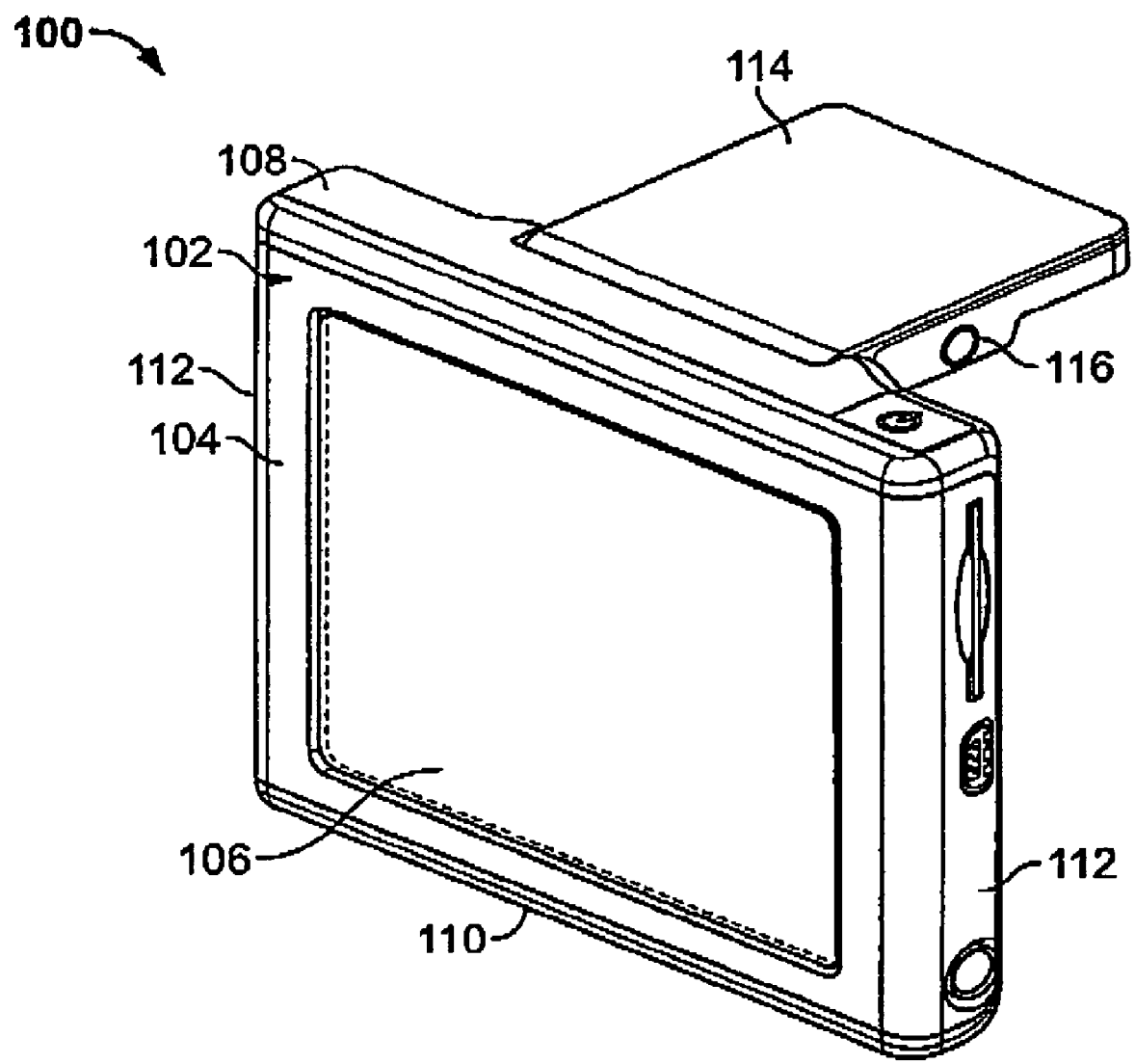
FIG. 1A illustrates a front isometric view of a portable navigation device with an antennae open formed in accordance with an embodiment of the present invention.
Figure 1B:
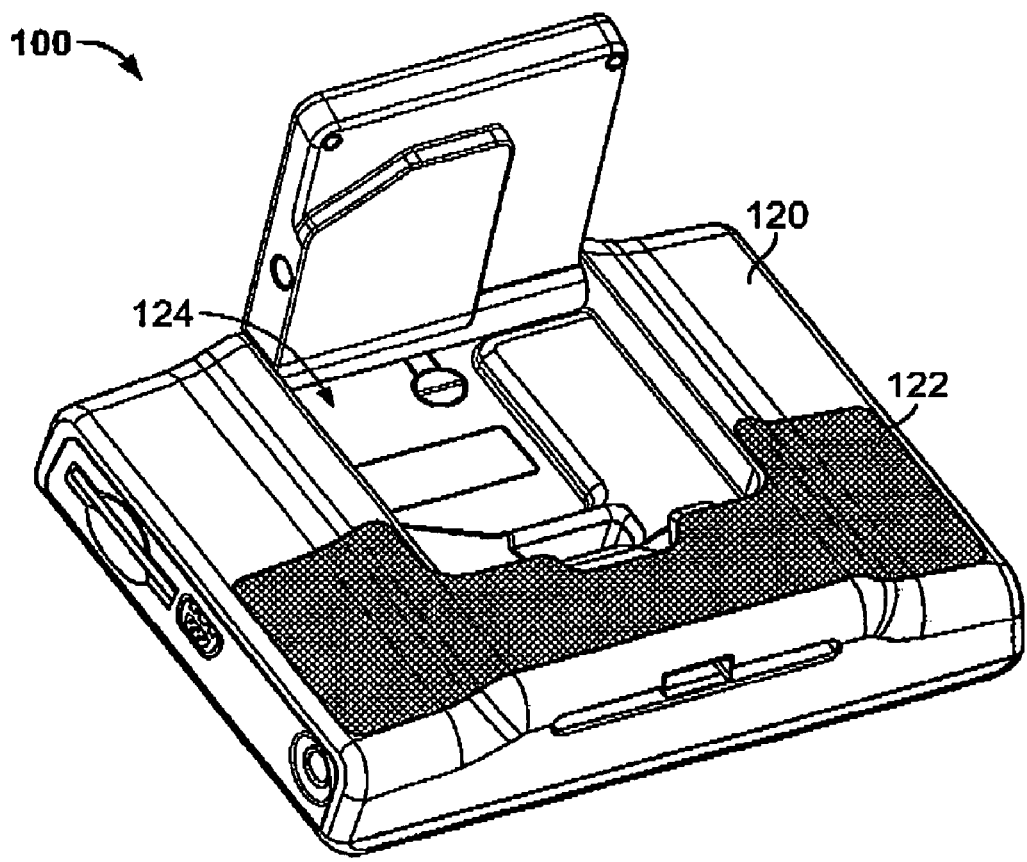
FIG. 1B illustrates a rear isometric view of the portable navigation device of FIG. 1A.

FIGS. 1A, and 1B illustrate isometric views of a portable navigation device 100 formed in accordance with an embodiment of the present invention. The device 100 includes a housing 102 having a front face 104 that includes a touch sensitive screen 106 provided therein. The device 100 includes a top 108, a bottom 110 and sides 112. An antenna 114 is rotatably mounted to the housing 102 proximate the top 108. The antenna 114 includes a port 116 that is configured to be joined to an external GPS antenna. As shown in FIG. 1B, the housing 102 has a back face 120 that includes a speaker 122 configured to play audible information to the user, such as navigation and language translation/dictionary information. For example, the speaker 122 may output turn-by-turn directions, words or phrases in a selected language and the like. The back face 120 also includes an open chamber 124 shaped to receive the antenna 114 when the antenna 114 is rotated to the closed position.

Figure 1C:
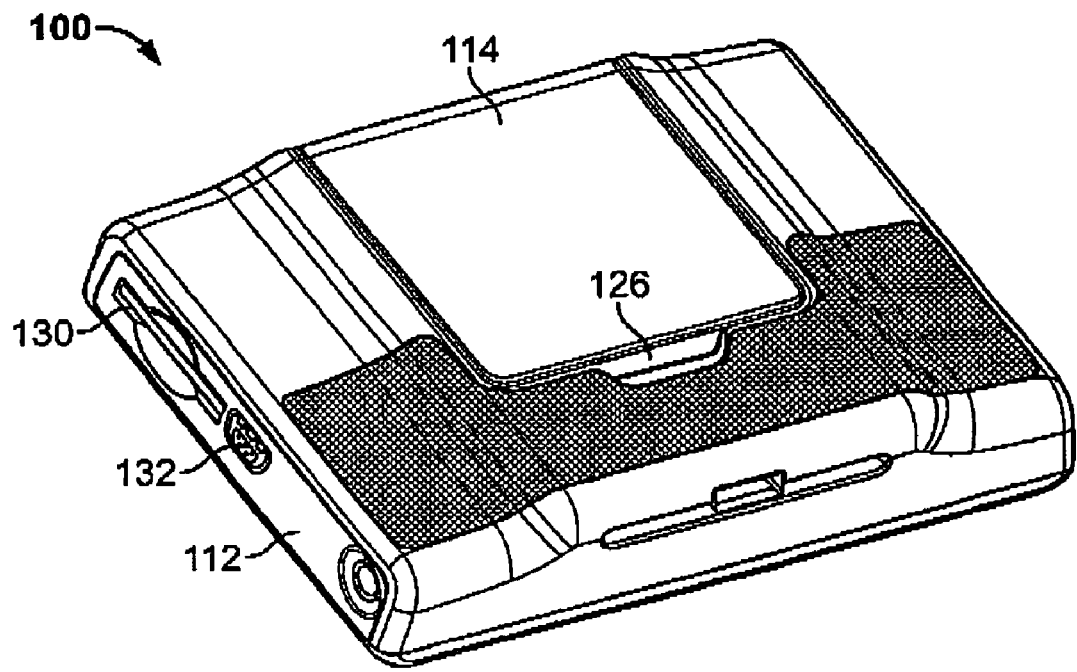
FIG. 1C illustrates a rear isometric view of the portable navigation device of FIG. 1 with the antenna closed.

FIG. 1C illustrates the device 100 with the antenna 114 in the closed position. A latch 126 is provided to retain the antenna 114 in the closed position. Side 112 includes a card slot 130 that is configured to receive cards, such as a removable security data card. The side 112 also includes a USB port 132, such as for recharging a battery held within the housing 12. In addition, the USB port 132 may be used for reprogramming and data transfer between the device 100 and a computer.

Figure 2A:
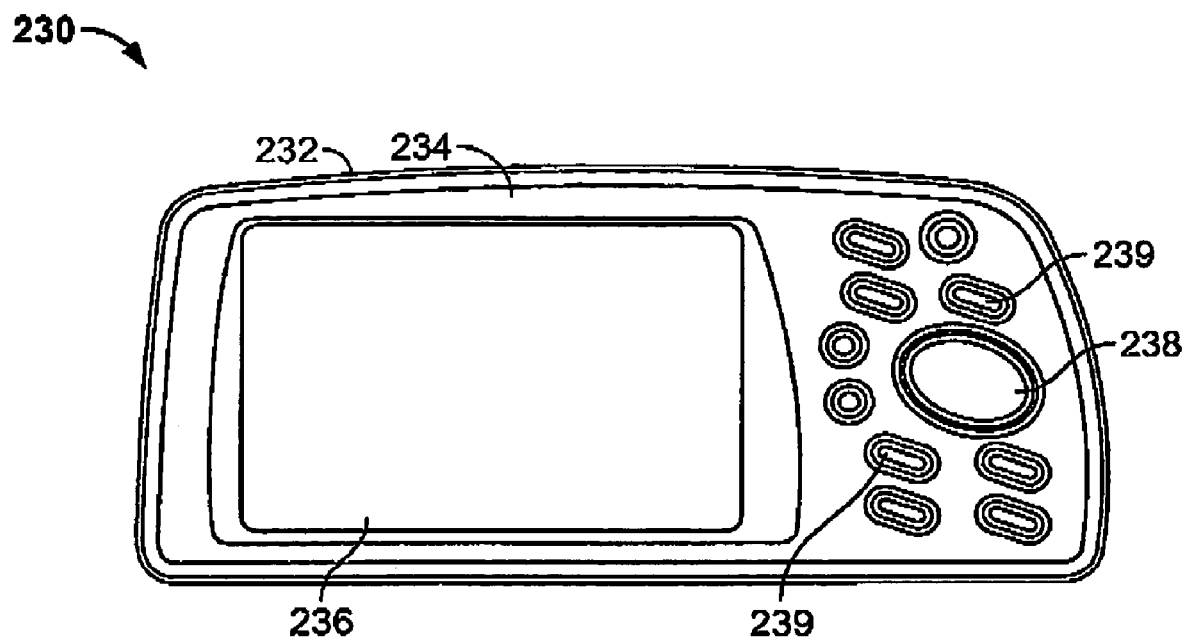
FIG. 2A illustrates a front plan view of a portable navigation device formed in accordance with an alternative embodiment of the present invention.
Figure 2B:
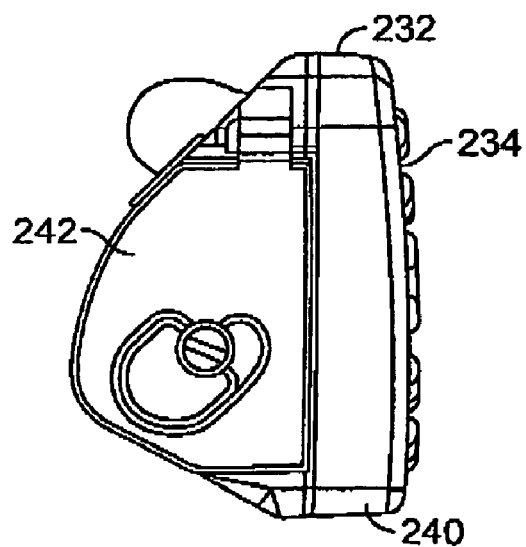
FIG. 2B illustrates an end plan view of the portable navigation device of FIG. 2A.

FIGS. 2A and 2B illustrate views of an electronic navigational device 230 formed in accordance with an embodiment. The device 230 may be portable and may be utilized in any number of implementations such as automobile, personal marine craft, and avionic navigation. In the embodiment of FIG. 2A a front view of the navigational device 230 is provided showing the navigational device to have a generally rectangular housing 232. The housing 232 is constructed of resilient material and has been rounded for aesthetic and ergonomic purposes. As shown in FIG. 2A, the control face 234 has access slots for an input key pad 238, other individual keys 239, and a display screen 236. In one embodiment, the display screen 236 is a LCD display which is capable of displaying both text and graphical information. The invention, however, is not so limited. Audio information can likewise be provided.

In FIG. 2B, a side view of the navigational device 230 is provided. FIG. 2B illustrates that the devices housing 232 is defined by an outer front case 240 and a rear case 242. As shown in FIG. 2B, the outer front case 240 is defined by the control face 234. In the embodiment shown in FIG. 2B, the outer front case 240 and the rear case 242 are made of one molded piece to form the device housing 232 and support input key pad 238, other individual keys 239, and display screen 236 in respective access slots shown in the control face 234 of FIG. 2A.

Figure 3A:
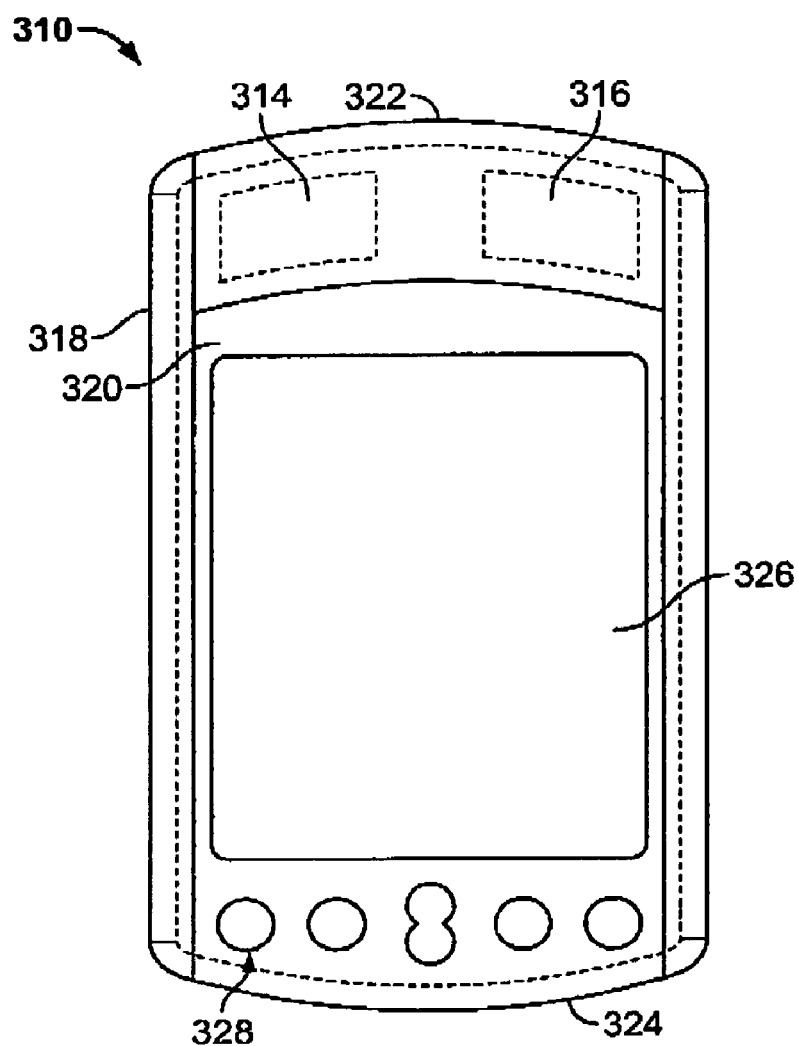
FIG. 3A illustrates a front plan view of a portable navigation device formed in accordance with an alternative embodiment of the present invention.
Figure 3B:
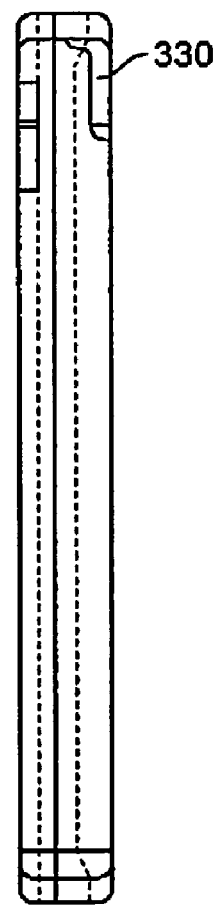
FIG. 3B illustrates a side plan view of the portable navigation device of FIG. 3A.
Figure 3C:
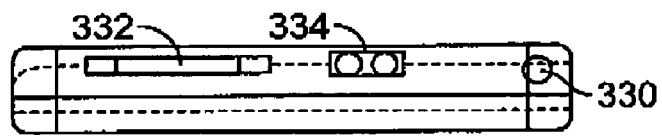
FIG. 3C illustrates an end plan view of the portable navigation device of FIG. 3A formed in accordance with an embodiment of the present invention.

FIGS. 3A-3C illustrate views for another embodiment of an electronic navigational device 310. The navigational device 310 shown in FIGS. 3A-3C includes a personal digital assistant (PDA) with integrated GPS receiver and cellular transceiver according to the teachings of the present invention. The GPS integrated PDA operates with an operating system (OS) such as, for example, the well-known Palm or Pocket PC operating systems, or the lesser-used Linux OS. As shown in the top view of FIG. 3A, the GPS integrated PDA 310 includes an internal integrated GPS patch antenna 314 and a cellular transceiver 316 contained in a housing 318. The housing 318 is generally rectangular with a low profile and has a front face 320 extending from a top end 322 to a bottom end 324. Mounted on front face 320 is a display screen 326, which is touch sensitive and responsive to a stylus 330 (shown stored in the side view of FIG. 3B) or a finger touch. FIGS. 3A-3C illustrate the stylus 330 nested within housing 318 for storage and convenient access in a conventional manner. The embodiment shown in FIG. 3A illustrates a number of control buttons, or input keys 328 positioned toward the bottom end 324. The invention, however, is not so limited and it is understood that the input keys 328 can be positioned toward the top end 322 or at any other suitable location. The end view of FIG. 3C illustrates a map data cartridge bay slot 332 and headphone jack 334 provided at the top end 322 of the housing 318. Again, the invention is not so limited and instead the map data cartridge bay slot 332 and headphone jack 334 may be provided at the bottom end 324, separately at opposite ends, or at any other suitable location.

It should be understood that the structure of GPS integrated PDA 310 is shown as illustrative of one type of integrated PDA navigation device. Other physical structures, such as a cellular telephone and a vehicle-mounted unit are contemplated within the scope of this invention.

Figure 4:
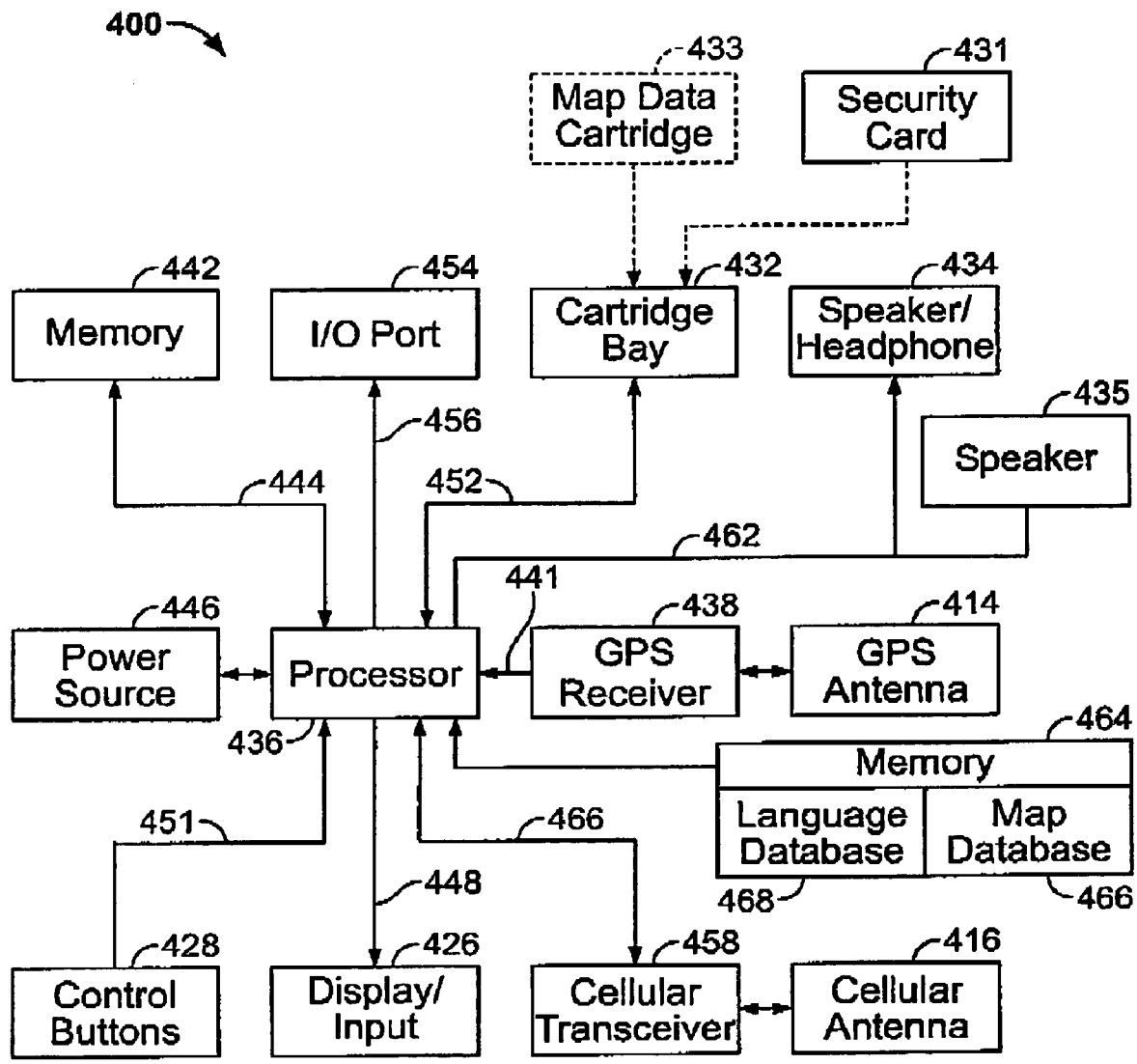
FIG. 4 illustrates a block diagram of the electronic components within the portable navigation devices of FIGS. 1-3.

FIG. 4 illustrates a block diagram of one embodiment for the electronic components 400 within the device 100, 230 or 310. The electronic components 400 shown in FIG. 4 include a processor 436 which is connected to a GPS antenna 414 through GPS receiver 438 via line 441. The GPS antenna 414 is configured to receive GPS signals from satellites. The processor 436 interacts with an operating system (such as PalmOS; Pocket PC) that runs selected software depending on the intended use of the device 100, 230 or 310. Processor 436 is coupled with memory 442 such as RAM via line 444, and power source 446 for powering the electronic components of the device 100, 230 or 310. The processor 436 communicates with touch sensitive display screen 426 via data line 448.

The electronic components 400 further include two other input sources that are connected to the processor 436.

Control buttons 428 are connected to processor 436 via line 451. A map data cartridge 433 and/or a security card 431 may be inserted into cartridge bay 432 that is connected via line 452 to the processor 436. A conventional serial I/O port 454 is connected to the processor 436 via line 456. Cellular antenna 416 is connected to cellular transceiver 458, which is connected to the processor 436 via line 466. Processor 436 is connected to the speaker/headphone jack 434 via line 462. Line 462 is also connected to a speaker 435 for audibly playing navigation and language translation/dictionary information. For example, the speaker 435 may output turn-by-turn directions, words or phrases in a selected language and the like. The device may also include an infrared port (not shown) coupled to the processor 436 that may be used to transmit information from one device to another.

The electronic components 400 also include memory 464 that may be configured to store one or both of a map database 466 and a language database 468. The map database 466 stores cartographic mapping information associated with a roadway network, while the language database 468 stores dictionary information, language information, translation information and the like. In operation, the processor 436 accesses the map database 466 and/or map data cartridge 433 in connection with navigation operations and routing calculations. The processor 436 accesses the language database 468 in connection with translation and other language related operations.

Optionally, the language database 468 and the map database 466 may be provided in entirely separate memory modules. For example, memory 442 may store the map database 466, while memory 464 stores the language database 468. For example, one or both of the language database 468 and map database 466 may be provided on plug-in memory modules that are plugged into the cartridge bay 432 and subsequently accessed by the processor 436 to perform language/translation operations and navigation operations, respectively.

The electronic components 400 shown in FIG. 4 are powered by a power source (not shown). Different configurations of the components shown in FIG. 4 are considered within the scope of the present invention. For example, in one embodiment, the components 400 shown in FIG. 4 are in communication with one another via wireless connections and the like. Thus, the scope of the navigation device includes a portable electronic navigational aid device.

The cartographic database includes any number of locations and data indicative of thoroughfares of a plurality of types connecting certain ones of the locations. In memory, different types of thoroughfares are contained in a data structure organized in a hierarchy of detail levels, or layers. The processor 436 utilizes the route calculation algorithm to find a path, or convergence, between any two of the number of locations based on various criteria. Optionally, a set of criteria includes; a number of jump segments requirement, a distance requirement, a minimum memory usage requirement, a maximum memory usage requirement, and an at least one jump segment requirement. The set of criteria may be independently variable in order to tailor an aggressiveness with which the route calculation algorithm forces switching between different levels in the hierarchy of detail levels. Optionally, the hierarchy of detail levels may include a hierarchy of ever-decreasing detail levels such that a lowest level includes the greatest amount of detail. Any other suitable hierarchy of detail levels may be used.

In one embodiment, a type of thoroughfare in any given layer of the hierarchy of detail layers is determined by a traversability of the thoroughfare. For example, the traversability of the thoroughfare can be determined by the driveability of a road. Herein, the driveability of the road may be determined by the classification of the road, a speed classification of the road, a driving history on the road, and the like. However, the invention is not so limited and one of ordinary skill in the art will understand upon reading and comprehending this disclosure, that other criteria for determining the presence of a type of thoroughfare in any given layer of the hierarchy can be suited to the present invention.

Electronic components 400 further include a display 440 in communication with the processor 410 and the memory 430. The display 440 is adapted to display all or part of the navigation information and the language/translation information.

Figure 5:
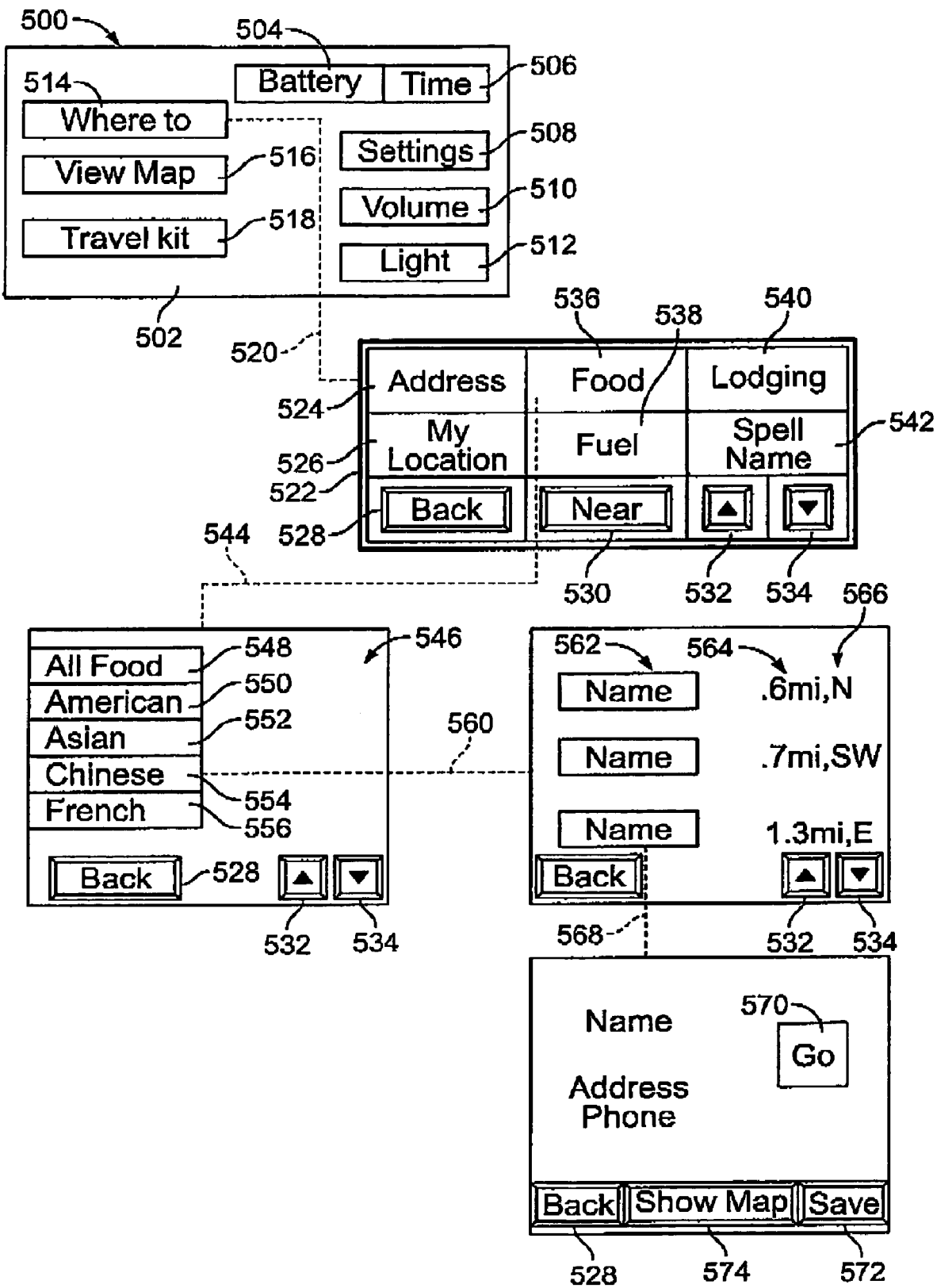
FIG. 5 illustrates a series of exemplary screen shots presented by the portable navigation device in connection with a processing flow in accordance with an embodiment of the present invention.

Next, an exemplary operation flow will be explained in connection with a series of exemplary screens presented on the display 426 and shown in FIGS. 5-14. FIG. 5 illustrates a main menu 500 presented when the device is initially turned on or returned to the home page/menu. The main menu 500 includes a series of virtual buttons or icons or soft keys associated with certain functions (generally "icons"). Each icon represents a defined area on the screen 502, with each area having a sufficient size and separation from one another to be independently selected with a finger touch (e.g. a 6 mm×6 mm square area, a 10 mm×10 mm square and the like). The icons maybe any shape (e.g. square, rectangle or, circular, triangular, trapezoidal and the like). The icons may be presented in a cascaded window manner such that certain icons overlap one another similar to the operation of independent windows on a computer.

In the example of FIG. 5, the main menu 500 includes a battery icon 504, a time icon 506, a settings icon 508, a volume icon 510, and a light icon 512. The battery icon 504 is selected when the user wishes to determine the remaining battery life, while the settings icon 508 is selected when the user desires to change the system settings of the device. Examples of system settings include map, display, and the like. The volume and lighting icons 510 and 512 are selected when the user desires to adjust the volume of the audio output from the device and the back lighting characteristics of the screen 502, respectively. The main menu 500 also offers a "Where-to" icon 514, a "View-Map" icon 516, and a "Travel-Kit" icon 518. The Where-to icon 514 and View-Map icon 516 are utilized in connection with navigation operations. For example, the user may select the Where-to icon 514 when the user desires to identify a destination (e.g. locate a restaurant, hotel, gas station, and other points of interest). The View-Map icon 516 is selected when the user desires to view a map of an area, such as surrounding the present location of the user, surrounding a point of interest and the like. The Travel-Kit icon 518 is selected when the user desires to perform travel related operations.

A dashed line 520 is shown to illustrate the next screen shot presented when the user selects the Where-to icon 514. When the user selects the Where-to icon 514, a category menu 522 is shown having various categories of potential interest to the user. From the category menu 522, the user may select an address icon 524 to enter and locate a specific address. The user may select the "my location" icon 526, from which the device identifies the user's present location and shows it to the user as a map and/or address. A back icon 528 directs the device to move back to a prior screen or the main menu 500. A near icon 530 instructs the device to show the user points of interest within each category nearest the user. Scroll down and scroll up icons 532 and 534 allow the user to view additional categories that, due to space limitations, are not all able to be presented on a single screen. For example, additional categories may include intersections, attractions, shopping, banks/ATM's, entertainment, recreation, community services, and the like.

The user selects one of the food icon 536, fuel icon 538 and lodging icon 540 depending on whether the user wishes to view near restaurants, gas stations, and hotels, respectively. The "spell name" icon 542 instructs the device to present an ABC formatted keypad, from which the user types a name or address of a particular location or point of interest.

The following more detailed example is set forth in connection with identifying a restaurant. However, the following description is applicable to any location or point of interest selectable through any category or subcategory. When the food icon 536 is selected, flow passes along dashed line 544 and the screen presents an alphabetical list of food subcategories 546, from which the user may select. Examples include All-Food icon 548, American food icon 550, Asian food icon 552, Chinese food icon 554, French food icon 556 and the like. A back icon 528 permits the user to move back to the category menu 522, while scroll down and scroll up icons 532 and 534 permit the user to view additional food subcategories. When the Chinese food icon 554 is selected flow passes along dashed line 560 and the screen presents a list of Chinese restaurant names 562, along with the distance 564 and direction 566 to each of the corresponding restaurants. Optionally, the restaurant names 562 may be sorted based upon the nearest restaurant to the present location of the user, alphabetically, and the like. When a particular restaurant is identified, flow passes along dashed line 568 and the screen presents information related to a selected restaurant, such as the name, address, phone number and the like. A GO icon 570 is also presented that may be selected when the user desires to calculate a route from the user's present location to the restaurant. A save icon 572 may be selected when the user desires to save the location of the restaurant as a waypoint in a waypoint list saved in the map database 466. A show map icon 574 may be selected when the user desires to view a roadway map of the area including or surrounding the restaurant selected.

Figure 6:
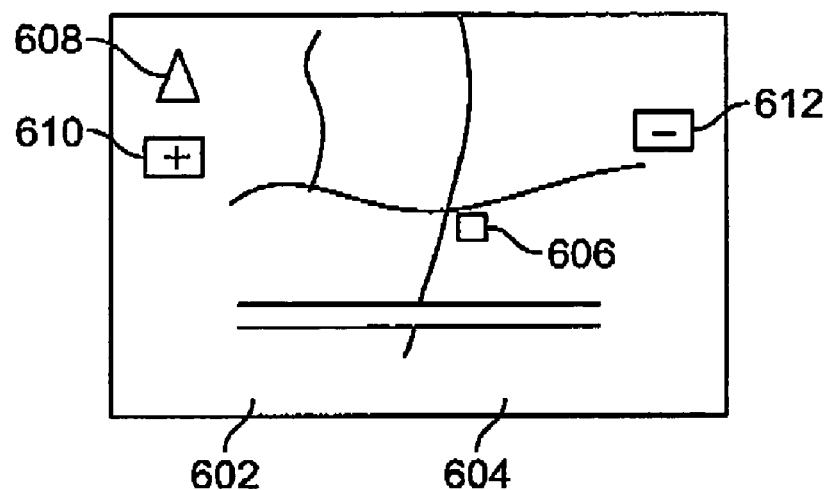
FIG. 6 illustrates a screenshot of a map presented by the display of the portable navigation device.

FIG. 6 illustrates a screen shot 602 that is presented when the show map icon 574 is selected in FIG. 5. The screen shot 602 includes a roadway map 604 of the road network surrounding a selected restaurant 606. The screen shot 602 includes a direction indicator 608 indicating which direction is north. The screen shot 602 also includes zoom in and zoom out icons 610 and 612 that permit the user to zoom into a lower level more detailed road map surrounding the restaurant 606 or to zoom out to a higher level less detailed road map. Optionally, the user may touch an area on the roadway map 604 to "grab" a point and drag the user's finger across the screen 602 in order to scroll the map up, down, left and right. The device also offers simulated travel to the point of interest from the user's present location. Again, it is reiterated that the above example was provided in connection with identifying a restaurant. However, it is understood that the above process and screen formats may be presented with any point of interest for all categories and subcategories.

Figure 7:
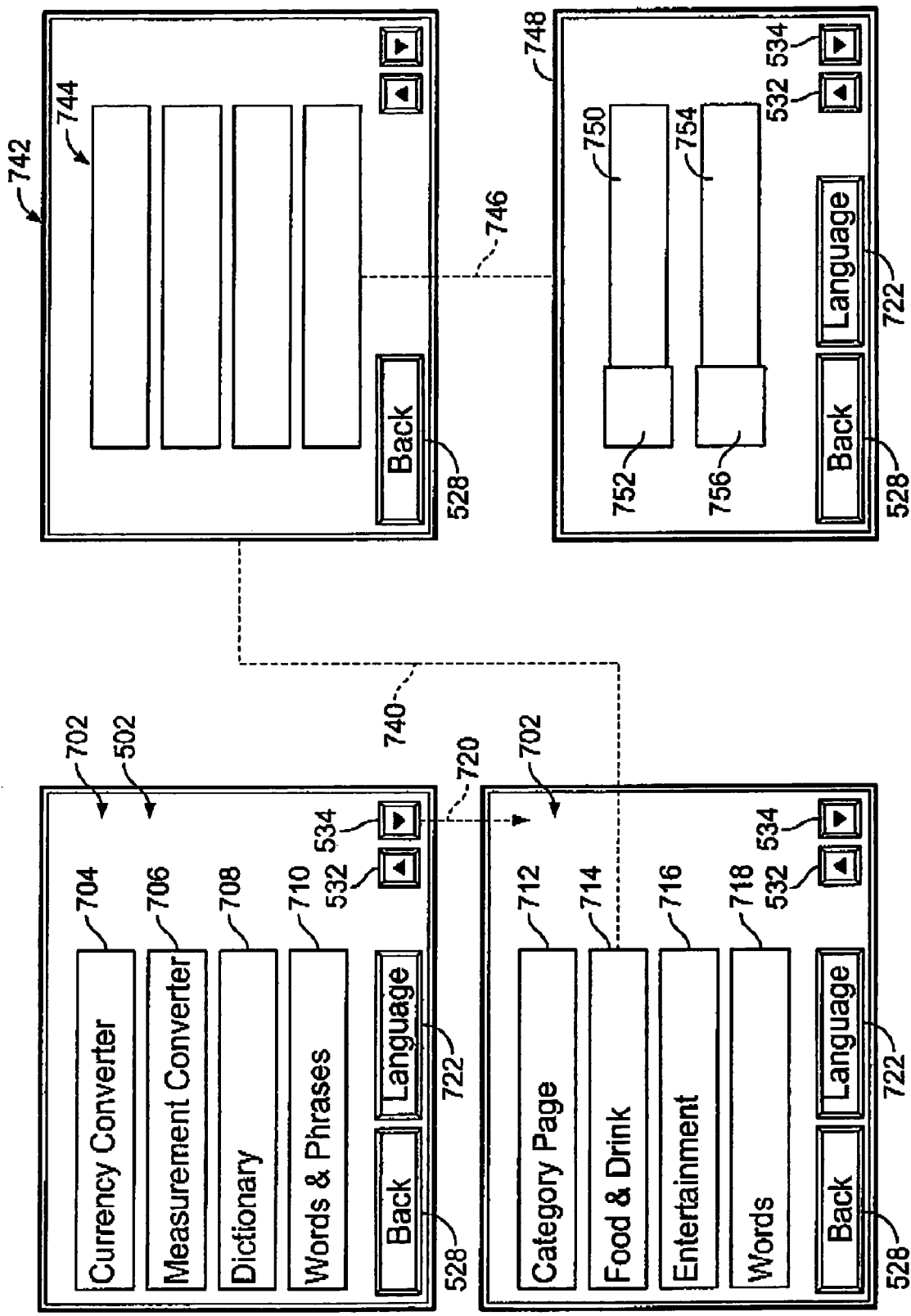
FIG. 7 illustrates exemplary screen shots presented by the portable device in accordance with an embodiment of the present invention.

FIG. 7 illustrates a flow process carried out when the Travel Kit icon 518 (FIG. 5) is selected. When the travel kit option is selected, a travel kit category menu 702 is presented on the screen 502 that includes options such as a currency converter icon 704, a measurement converter icon 706, a dictionary icon 708 and words & phrases icon 710. The travel kit category menu 702 includes a back icon 528 and scroll up and scroll down icons 532 and 534. When the scroll down icon 534 is selected (as denoted by dashed line 720), a second screen is shown of more options in the travel kit category menu 702, including a category page icon 712, a food and drink icon 714, an entertainment icon 716 and a Words icon 718. When the Word icon 718 is selected, a listing of alphabetical words is illustrated. Other examples of potential icons in the travel kit category menu 702 include an MP3 player, audible book player, picture viewer, world clock, a calculator and the like.

The measurement conversion icon 706 permits the user to enter a measurement in one unit (e.g. miles, yards, feet and the like) and the device automatically converts the units to a another unit (e.g., kilometers, meters, centimeters and the like). The device performs the conversation based upon measurement tables stored in the memory 464 correlating different units to one another. The currency converter icon 74 permits the user to enter a denomination of currency (e.g. US dollars and cents) and the device automatically calculates an equal denomination of currency in a select foreign currency (e.g. pounds, Euros, Shackles, Cronin and the like). The device performs the conversion based upon stored currency conversion data that may be periodically updated through a wireless or wired connection with a remote network, computer, Internet link, GPS satellite auxiliary link and the like.

Figure 8:
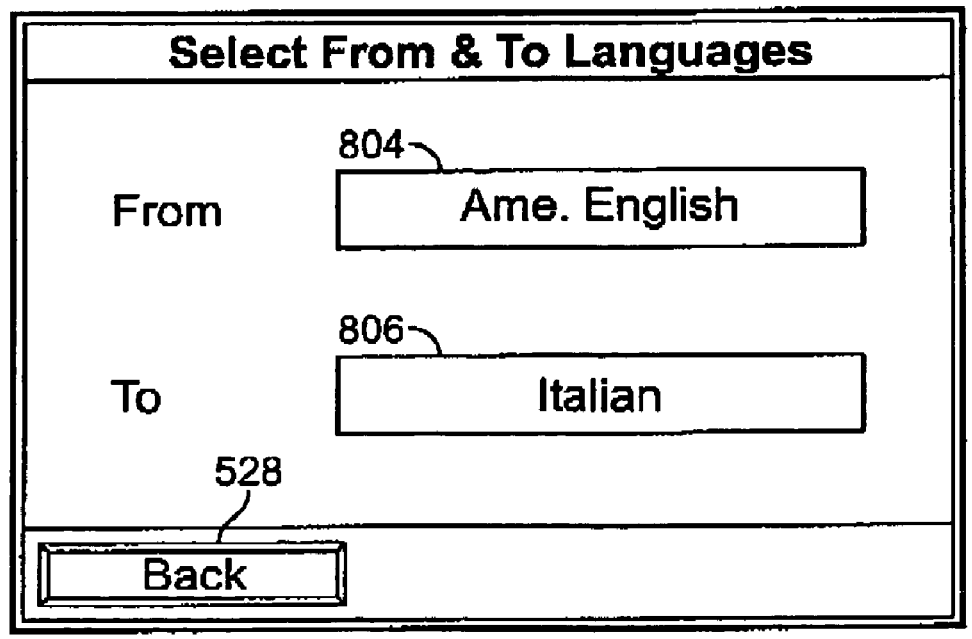
FIG. 8 illustrates an exemplary screenshot presented by the portable device in connection with the dictionary/translation functions.

The travel kit category menu 702 also includes a language conversion icon 722 that, when selected, permits the user to change the from/base and to/destination languages. When the language conversion icon 722 is selected, a language conversion menu 802 is presented (as shown in FIG. 8) that includes the from/base language icon 804 and the to/destination language icon 806. When either of icons 804 or 806 or selected, the user is presented with a list of languages from which to choose.

FIG. 7 illustrates an example of when the food and drink icon 714 is selected. Flow passes along dashed line 740 when the food and drink icon 714 is selected. A phrase menu 742 is presented with a list of phrases 744 related to commonly asked questions in connection with ordering and locating food and drink. For example, the phrases may include "Where it is the nearest restaurant", "May I have a glass of water", "What do you recommend on the menu", "I am allergic to shellfish", "are vegetables included" and the like. The words and phrases in menu 742 are presented in the base/from language. When a phrase 744 is selected, flow passes along path 746 to a phrase translation window 748. The phrase translation window 748 includes the selected phrase in the base language at window 750, along with an audible icon 752. When the audible icon 752 is selected, the phrase is audibly played by the device through speaker 122 (FIG. 1) or 435 (FIG. 4). The phrase translation window 748 also includes the same phrase in a conversion window 754, but in the to/destination language. An audible icon 756 is provided proximate the conversion window 754 and, when selected, directs the device to audibly play the phrase in the selected destination language over speaker 122 (FIG. 1) or 435 (FIG. 4). The phrase translation window 748 also includes the back icon 528, language icon 722 and scroll up and scroll down icons 532 and 534.

When the dictionary icon 708 is selected, a menu of dictionary conversion options is presented (e.g. French to English, English to Spanish, Spanish to French, and the like). When the user selects one of the bilingual dictionary options, an alphabetical listing of words is presented. The user may enter a desired word through the ABC keypad presented on the screen. Once a desired word is entered, the word is presented in the destination language, along with a textual description of the usage of the word. An audible icon (similar to audible icon 752 or 756) is presented and, when selected, audibly outputs the destination word over speaker 122 (FIG. 1) or 435 (FIG. 4).

The language database 468 stores numerous common words and phrases that are used in certain circumstances often experienced by travelers. The words and phrases are organized by category of circumstance.

When the category page icon 712 is selected, a select category menu 902 is presented (FIG. 9) that includes travel-related category of icons, such as a problems icon 904, commerce icon 906, tourist icon 908, transportation icon 910, and a search for Key Word icon 912. The menu 902 includes the back icon 528, language icon 722, scroll up and scroll down icons 532 and 534. When the user selects a category from the menu 902, a list of words or phrases related to the category is presented. The list of words and phrases is presented in the base/from language, to permit a user to locate a desired word or phrase related to a particular category (e.g., circumstance or event). For example, when the problems icon 904 is selected, exemplary words and phrases may include "I need a doctor", "Please call a police man", "I have lost my hotel room key", "My passport has been stolen", "Stop that person, he stole my wallet" "Can you hear me now" and the like. When the commerce icon 906 is selected, exemplary words and phrases may include "Where is the nearest bank", "Do you take American Express", "How much do I owe" and the like. When the Search for Key Word icon 912 is selected, the user is prompt with an ABC formatted keypad (FIG. 10), from which the user may type a particular Key Word.

Figure 11:
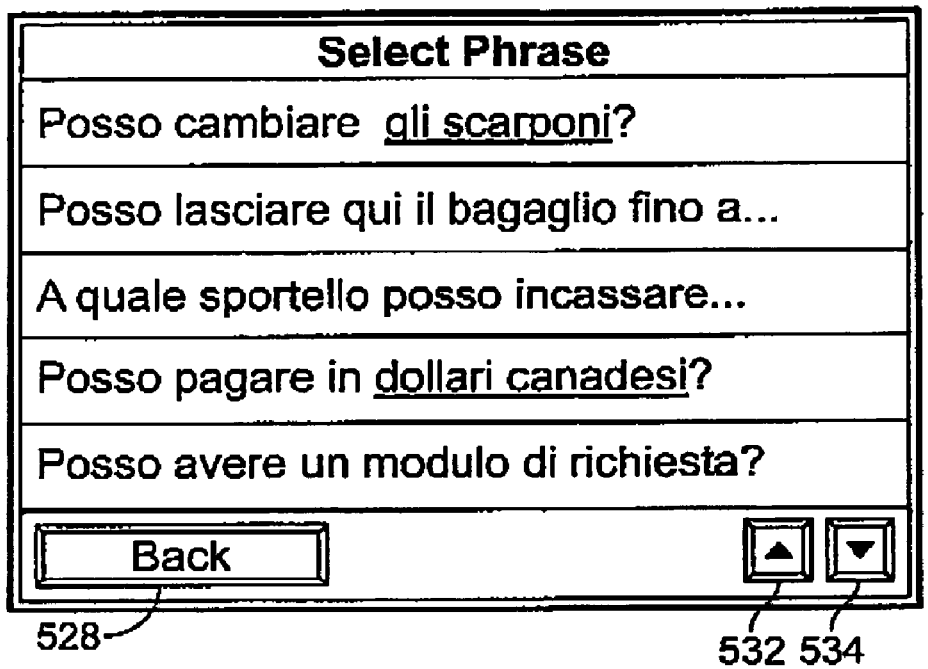
FIG. 11 illustrates an exemplary screenshot presented by the portable device in connection with the dictionary/translation functions.

FIG. 11 illustrates a phrase menu 1102, that includes a series of phrases related to a category or other topic selected by the user from a preceding menu. The phrases in FIG. 11 relate to a particular category and are presented in the from/base language. The device provides the ability to customize or build a template phrase using a selected word from a list of words stored in memory. A template represents a word or phrase with a portion that may be customized by the user. The portion may be present blank and the user is afforded options to fill-in the blank. Alternatively, the portion may represent an active field that is initially populated with an initial term. The user is the afforded the opportunity of select the field, after which the user is provided with alternative terms that may be inserted into the field. An active customizable field is preferably highlighted or underlined (or both) to provide a visual indication to the user that the underlined/highlighted field is customizable. Examples of templates are "May I please have _____?", "Where is the _____?" and the like. The device provides options for the user to fill-in the blank in the template in order to customize a phrase. For example, using a selected phrase template such as "May I have _____ wine?", the user be given the option of selecting a type of wine from a provided list for insertion in the blank. In particular, the phrase may be presented as "May I have [red, white, a merlot] wine?"

Figure 9:
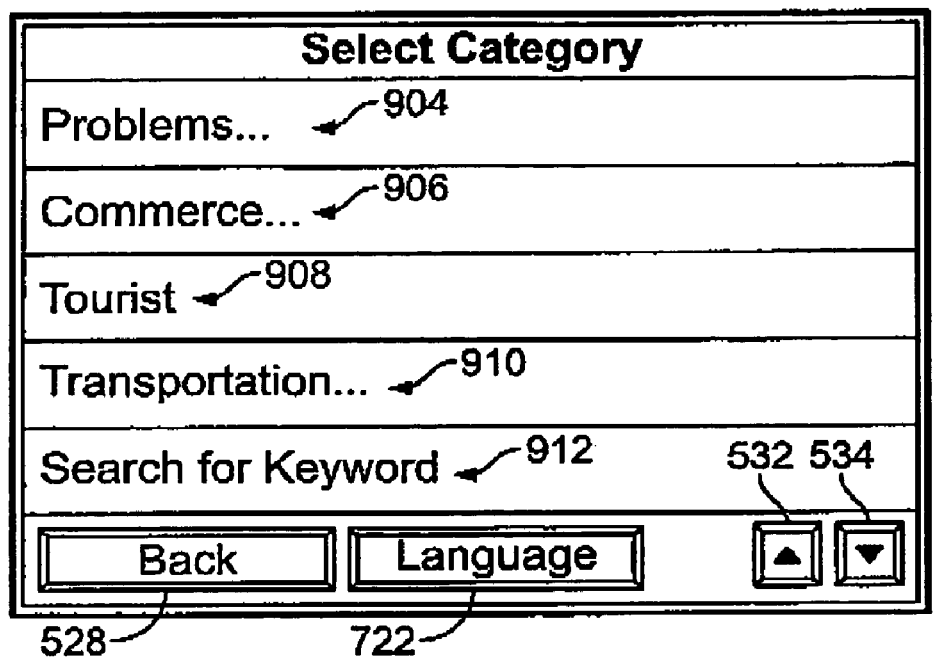
FIG. 9 illustrates an exemplary screenshot presented by the portable device in connection with the dictionary/translation functions.
Figure 10:
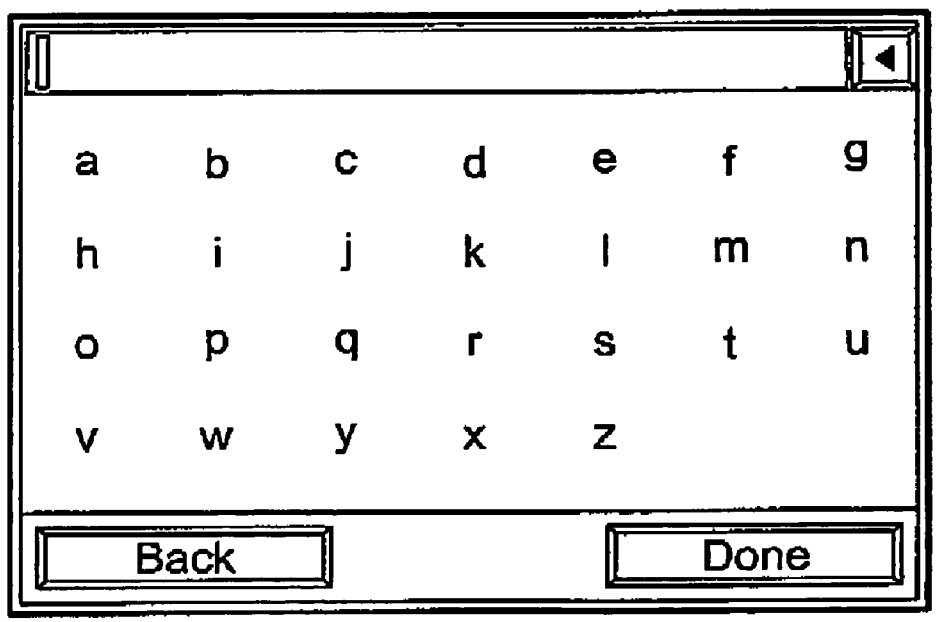
FIG. 10 illustrates an exemplary screenshot presented by the portable device in connection with the dictionary/translation functions.
Figure 12:
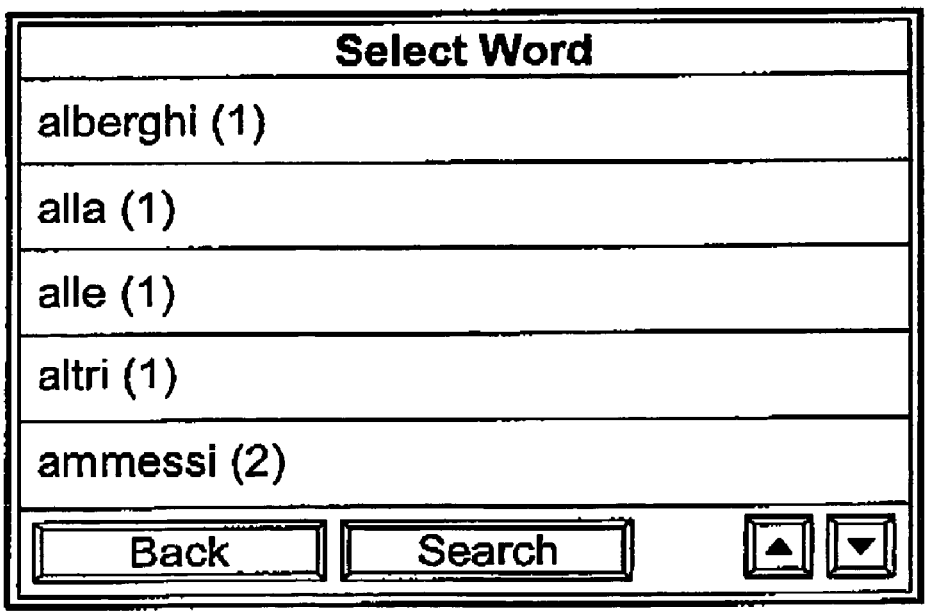
FIG. 12 illustrates an exemplary screenshot presented by the portable device in connection with the dictionary/translation functions.

FIG. 12 illustrates a Select Word menu 1202 that is presented when the user desires to search for a particular Key Word (such as by selecting the Search for Key Word icon 912 in FIG. 9).

Figure 13:
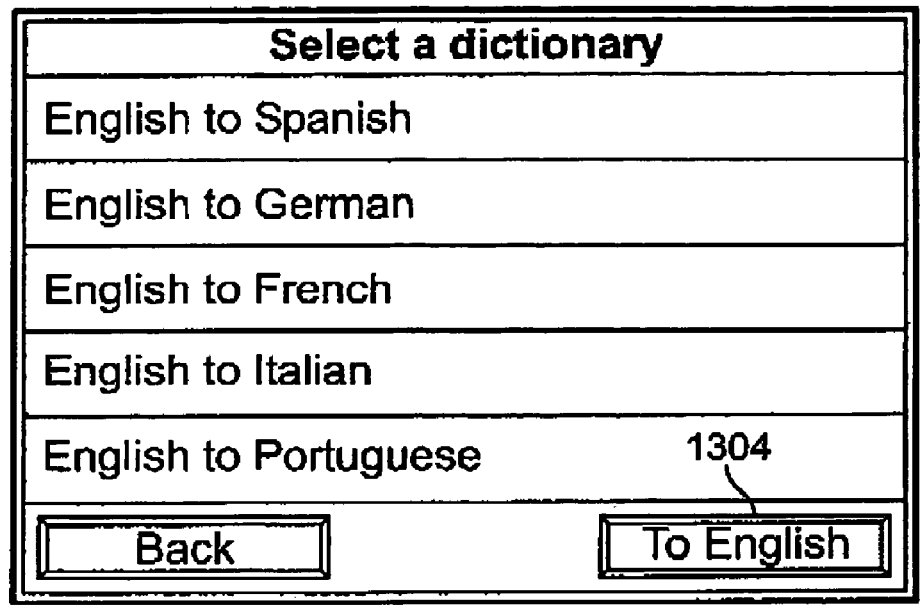
FIG. 13 illustrates an exemplary screenshot presented by the portable device in connection with the dictionary/translation functions.

FIG. 13 illustrates a Select a Dictionary menu 1302 that is presented when the user selects the dictionary icon 708 in FIG. 7. The Select a Dictionary menu 1302 permits the user to select the base/from language and the to/destination language. A "To English" icon 1304 permits the user to select a dictionary that converts words/phrases from a non-English language to English.

Figure 14:
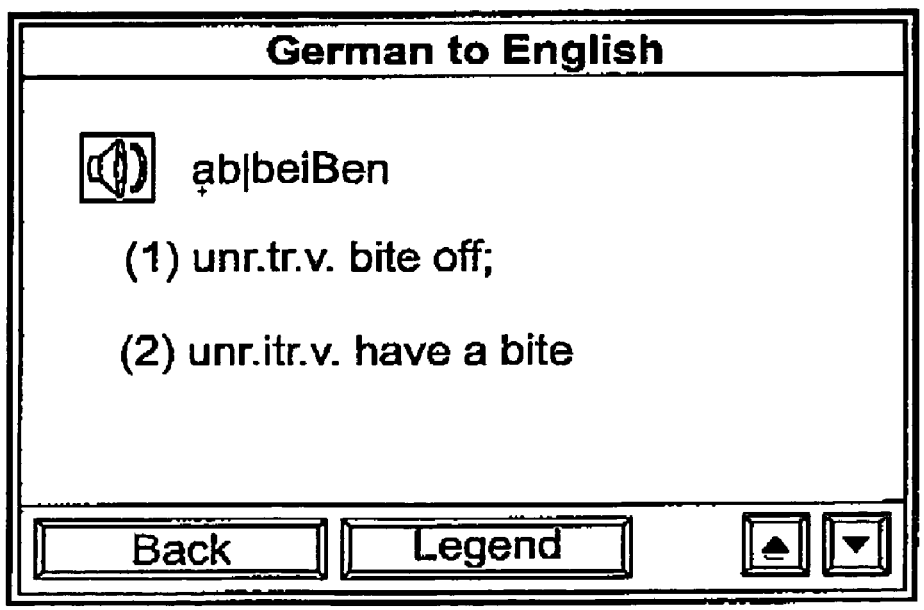
FIG. 14 illustrates an exemplary screenshot presented by the portable device in connection with the dictionary/translation functions.

FIG. 14 illustrates a dictionary conversion page showing a German Word and two alternative interpretations in English depending upon the usage of the term. The dictionary conversion page may be presented at several points in the toolkit flow, depending upon earlier selections by the user.

Figure 15:
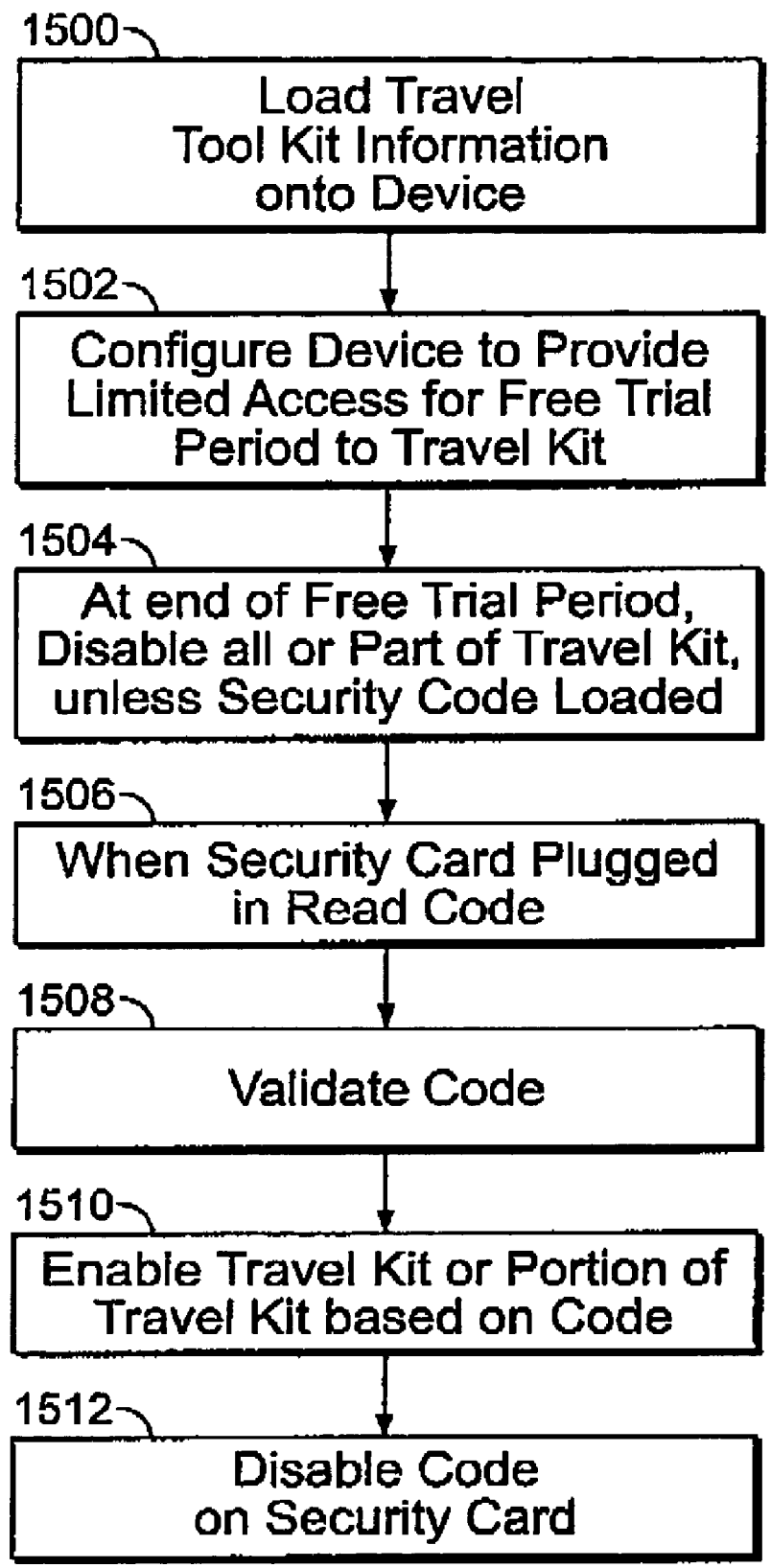
FIG. 15 illustrates a flow chart performed in accordance with an alternative embodiment of the present invention for providing limited access to select features or functions preprogrammed into the portable device in accordance with an embodiment of the present invention.

FIG. 15 illustrates a flow chart of an operation sequence performed in accordance with an alternative embodiment of the present invention for providing limited access to select features or functions preprogrammed into the device. The device is configured to initially store a full and complete Tool Kit database. When the device is initially purchased by user, the full and complete tool kit database is made fully available to the user for a limited free trial term. At the end of the limited free trial term (e.g. 30 days), the device automatically disables or "times out" all or a portion of the tool kit database. Upon disablement, the tool kit features and functions are no longer accessible to the user, unless and until the user purchases a security card 431 that, when plugged into the device, re-enables all or a portion of the tool kit information, features and functions.

The security card 431 includes memory storing a code (e.g. encrypted code) that is read by the device once the security card is plugged into the cartridge bay 432 (FIG. 4). Once the security card 431 is plugged into the cartridge bay 432, the processor 436 reads the code and, based thereon, determines whether and to what extent to unlock the tool kit features and functions.

FIG. 15 illustrates in exemplary application of the free trial and security card features. At 1500, the device is initially loaded with the travel kit information, including but not limited to the dictionary and translation information. At 1502, the device configures itself to provide complete or limited access to the travel kit information for a trial term. At 1504, upon the completion of the free trial term, the device disables all or select portions of the travel kit features. The disablement occurs unless a security code has been previously loaded into the device through insertion of a security card 431. If, at the end of the free trial term, no security card 431 has been loaded, then the travel kit features are no longer provided to the user.

Should the user subsequently decided to purchase permanent access to the travel kit features, the user does so by purchasing a security card 431 that includes in memory, a valid code indicating that the user now has purchased unlimited access to the travel kit features. Once the security card 431 is loaded, the device reads from the memory thereon the code and, at 1508, determines whether the code is valid. For example, all devices may be preconfigured with a common general validation code that is compared to the code on the security card 431. Alternatively, separate codes may be provided to individual devices or devices sold within selected geographic regions or select periods of time (e.g. annually or based on the version of the device). At 1510, once the security code is validated, the device re-enables all or a portion of the travel kit features.

For example, the user may desire to only have certain travel kit features and thus purchase a lower cost subset of the travel kit features (uniquely identified by a particular security code). Thus, different security codes may indicate to the device that the user is entitled to different levels of access to the features and functionality of the travel kit information. At 1512, the device disables the security code on the security card 431 in order that the same security card 431 may not be subsequently used with the same or different device. The disablement may be achieved by erasing the security code on the security card 431, by writing over the security code, or by writing additional information to memory within the security card 431 indicating that the card has been used.

While the description in connection with FIG. 15 relates to a toolkit application, it is understood that the process of FIG. 15 and the security card 431 (FIG. 4) may be utilized in connection with navigation applications and other non-navigation applications. The travel toolkit is only one example of non-navigation applications. More generally, the process of FIG. 15 may be carried out with a portable navigation device that includes a receiver configured to receive signals from GPS satellites. The device includes memory that stores a non-navigation application and non-navigation information related to the non-navigation application. A user interface is configured to enable an operator to enter non-navigation instructions related to the non-navigation application. The a processor module is provided that calculates a position of the device based on the signals from the GPS satellites. The processor module implements the non-navigation application and performs non-navigation operations defined by the non-navigation application based on the non-navigation instructions entered by the user. The processor module disables the non-navigation application after a predetermined trial period of time following a start time unless and until an application access code is entered. Optionally, a cartridge they may be included that is configured to receive an application access cartridge containing the application access code. The code indicates that access to the non-navigation application has been purchased by the user of the device. The processor module enables the non-navigation application when the application access cartridge is entered into the cartridge bay with a valid code. The processor may not disable the non-navigation application, such as when an application access code is incurred before and in of the predetermined trial period of time.

The cartridge bay 432 is configured to receive the application access cartridge (security card 431) containing the application access code. The code on security card 431 indicates that access to the non-navigation application has been purchased by the user of the device. The processor 436 enables the non-navigation application when the application access cartridge is entered into the cartridge bay with a valid application access code. The processor 436 re-enables the non-navigation application only when the non-navigation application has already been disabled (such as at the end of the predetermined trial period of time). Alternatively, the processor 436 may never disable the non-navigation application, such as when an application access code is entered before an end of the predetermined trial period of time.

The processor 436 may perform an initialization operation upon the device when the device is turned on for the first time after the user has purchased the device. In one example, the processor 436 may set the predetermined trial period of time to represent a set number of days (e.g. 30 days following purchase, until December 31 of the present calendar year, and the like) following initialization, or first start up, of the device. Alternatively, the predetermined trial period of time may be defined based on the number of hours that the device is used. For example, a new device may include 10, 20, or 50 free hours of use of the toolkit. Alternatively, the processor 436 may not perform an initialization operation, but instead simply initiate the predetermined trial period of time when the device is first started-up after purchase. As a further alternative, the predetermined trial period of time may begin after the user logs all into the manufacturer's web site and registers the device with the manufacturer.

Optionally, the application access code may be entered through the I/O port for 54, an infrared input, a user keypad, control buttons for 28, the display/input for 26, and the like. For example, a user may purchase a security code and enter the security code through the keypad or control buttons for 28.

While the invention has been described in terms of various specific embodiments, those skilled in the art will recognize that the invention can be practiced with modification within the spirit and scope of the claims.

What is claimed is:

1. A portable navigation device, comprising:
    a receiver configured to receive signals from global positioning system (GPS) satellites;
    memory storing a non-navigation application and non-navigation information related to the non-navigation application;
    a user interface configured to enable an operator to enter non-navigation instructions related to the non-navigation application;
    a processor module calculating a position of the device based on the signals from the GPS satellites, the processor module implementing the non-navigation application and performing non-navigation operations defined by the non-navigation application based on the non-navigation instructions entered by the user, the processor module disabling the non-navigation application after a predetermined trial period of time following a start time unless and until an application access code is entered.

2. The device of claim 1, further comprising a cartridge bay configured to receive an application access cartridge containing the application access code, the code indicating that access to the non-navigation application has been purchased by the user of the device, the processor module enabling the non-navigation application when the application access cartridge is entered into the cartridge bay with a valid code.

3. The device of claim 1, further comprising an input configured to receive the application access code, indicating that access to the non-navigation application has been purchased by the user of the device, the processor module re-enabling, if disabled, the non-navigation application when a valid application access code is entered.

4. The device of claim 3, wherein the input represents one of a cartridge bay, an I/O port, an infrared input, and a user keypad through which the user manually enters the code.

5. The device of claim 1, wherein the processor module never disables the non-navigation application when the application access code is loaded before an end of the predetermined trial period of time.

6. The device of claim 1, wherein the processor module initializes the device when the device is turned on for the first time after purchase, the predetermined trial period of time representing a set number of days following initialization.

7. The device of claim 1, wherein the predetermined trial period of time represents a defined number of hours that the device is turned on.

8. The device of claim 1, wherein the non-navigation application represents a travel-kit containing applications useful to travelers.

9. The device of claim 1, wherein the non-navigation application represents a dictionary and translation application.

10. The device of the claim 1, wherein, during initialization of the device, the processor module enables the non-navigation application for the predetermined trial period of time.

11. The device of claim 1, wherein the processor module initializes the device upon first start-up, during first start-up the processor module enabling the non-navigation application, the processor module disabling the non-navigation application after a predetermined trial period of time following the first start-up.

12. The device of claim 2, wherein the processor module validates the code when a security card is loaded into the cartridge bay.

13. The device of claim 2, wherein the processor module disables the card after reading the code from the security card to prevent the cartridge from being used again.

14. A method for managing access to non-navigation applications implemented on a portable navigation device, the method comprising:
- initializes the device upon first start-up to provide a user access to navigation and non-navigation applications stored on the device, the initialization including enabling the non-navigation application for a predetermined trial period of time following a start time;
- receiving signals from global positioning system (GPS) satellites;
- storing in memory a non-navigation application and non-navigation information related to the non-navigation application;
- calculating a position of the device based on the signals from the GPS satellites;
- implementing the non-navigation application based on non-navigation instructions entered by the user;
- disabling the non-navigation application at the end of the predetermined trial period of time unless and until an application access code is entered; and
- presenting position information and non-navigation information to the operator on a common display.

15. The method of claim 14, further comprising entering an application access cartridge containing the application access code, the code indicating that access to the non-navigation application has been purchased by the user of the device, and enabling the non-navigation application when the application access cartridge is entered with a valid code.

16. The method of claim 14, further comprising receiving the application access security code, the code indicating that access to the non-navigation application has been purchased by the user of the device, and re-enabling, if disabled, the non-navigation application when a valid application access code is entered.

17. The method of claim 14, wherein the non-navigation application is never disabled because the code is entered before an end of the predetermined trial period of time.

18. The method of claim 14, wherein the predetermined trial period of time representing a set number of days following initialization.

19. The method of claim 14, wherein the predetermined trial period represents a defined number of hours that the device is turned on.

20. The method of claim 14, wherein the non-navigation application represents a travel-kit containing applications useful to travelers.

21. The method of claim 14, wherein the non-navigation application represents a dictionary and translation application.

22. The method of claim 14, further comprising validating the application access code when a security card is loaded.

23. The method of claim 22, further comprising disables the application access code on a security card after reading the code from the security card to prevent the security card from being used again.

* * * * *